(12) United States Patent
Müller

(10) Patent No.: US 8,480,245 B2
(45) Date of Patent: Jul. 9, 2013

(54) EXTERIOR REARVIEW MIRROR FOR VEHICLES, IN PARTICULAR PASSENGER VEHICLES

(75) Inventor: Marcus Müller, Pforzheim (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 1025 days.

(21) Appl. No.: 12/169,011

(22) Filed: Jul. 8, 2008

(65) Prior Publication Data

US 2009/0015955 A1 Jan. 15, 2009

(30) Foreign Application Priority Data

Jul. 14, 2007 (DE) .......................... 10 2007 032 901

(51) Int. Cl.
*G02B 7/183* (2006.01)
(52) U.S. Cl.
USPC .......................................... 359/871; 348/476
(58) Field of Classification Search
USPC ........... 359/841, 844, 871–877; 248/476–487
See application file for complete search history.

(56) References Cited

U.S. PATENT DOCUMENTS

| | | | |
|---|---|---|---|
| 5,181,687 A | 1/1993 | Kerper | |
| 6,220,716 B1 * | 4/2001 | Asaka | 359/871 |
| 2004/0195860 A1 | 10/2004 | Koellner et al. | |
| 2007/0201153 A1 | 8/2007 | Tanaka | |

FOREIGN PATENT DOCUMENTS

| | | |
|---|---|---|
| DE | 1135319 | 8/1962 |
| DE | 35 08 226 A1 | 9/1986 |
| DE | 195 20 320 C1 | 5/1996 |
| DE | 698 00 004 T2 | 12/1999 |
| DE | 101 26 250 A1 | 12/2002 |
| GB | 1510215 A | 5/1978 |
| WO | 2005120899 A1 | 12/2005 |

OTHER PUBLICATIONS

European Search Report dated Nov. 6, 2008.
German Patent and Trademark Office Search Report, dated Apr. 7, 2008.

* cited by examiner

*Primary Examiner* — Jennifer L. Doak
(74) *Attorney, Agent, or Firm* — Gerald E. Hespos; Michael J. Porco; Matthew T. Hespos

(57) ABSTRACT

An exterior rearview mirror for vehicles, in particular for passenger vehicles, has a mirror foot which can be fixed on a front door below a vehicle belt line. The vehicle has a door formed of an outer panel which is provided with an opening, and an inner reinforcement. An extremely rigid, play-free and simply configured connection of the mirror foot to the inner reinforcement of the door is obtained in that a lower end region of a supporting part of the mirror foot is guided through the opening in the outer panel and is connected within the door directly to the inner reinforcement of the door via a self-centering mounting and a central fastening screw.

10 Claims, 6 Drawing Sheets

EXTERIOR REARVIEW MIRROR FOR VEHICLES, IN PARTICULAR PASSENGER VEHICLES

CROSS-REFERENCE TO RELATED APPLICATION

This application claims the priority, under 35 U.S.C. §119, of German application DE 10 2007 032 901.8, filed Jul. 14, 2007; the prior application is herewith incorporated by reference in its entirety.

BACKGROUND OF THE INVENTION

Field of the Invention

The invention relates to an exterior rearview mirror for vehicles, in particular passenger vehicles, with a mirror foot which can be fixed on a front door below a vehicle belt line, wherein the door has an outer panel which is provided with an opening, and an inner reinforcement.

Published, non-prosecuted German patent application DE 35 08 226 A1 discloses an exterior rearview mirror for a vehicle, with a mirror foot which can be fixed on a front door below a vehicle belt line, wherein the mirror foot is fastened to an inner reinforcement of the door via the intermediate connection of a retaining part.

In this arrangement, the retaining part is held in position on the inner reinforcement of the door via two fastening screws, and the mirror foot is connected via a further releasable fastening to a retaining part section located outside the door.

SUMMARY OF THE INVENTION

It is accordingly an object of the invention to provide an exterior rearview mirror for vehicles, in particular passenger vehicles which overcomes the above-mentioned disadvantages of the prior art devices of this general type, which has an extremely rigid, play-free connection of the mirror foot to the inner reinforcement of the door, and the connection is of a simple configuration.

With the foregoing and other objects in view there is provided, in accordance with the invention, an exterior rearview mirror for a vehicle having a front door. The exterior rearview mirror contains a self-centering mounting, a central fastening screw, and a mirror foot to be fixed on the front door below a vehicle belt line. The front door has an outer panel with an opening and an inner reinforcement. The mirror foot has an inner supporting part with a lower end region guided through the opening in the outer panel and connected within the front door directly to the inner reinforcement of the front door via the self-centering mounting and the central fastening screw.

The advantages primarily obtained with the invention are to be seen in the fact that a simply configured, extremely rigid and play-free connection of the mirror foot to the inner reinforcement of the door is ensured by the direct connection of the mirror foot to the inner reinforcement and by the self-centering mounting and the just one central fastening screw. The inner reinforcement of the door is formed by a preferably encircling, inner frame part which is produced from a light metal alloy by diecasting and is inherently relatively stiff. The self-centering mounting between the inner supporting part of the mirror foot and the inner reinforcement is formed by a 6-point mounting and is therefore unambiguously defined statically with respect to the forces and moments. The 6-point mounting is formed by integrally formed bearing sections on the inner frame part and on the lower end region of the supporting part, with, when the exterior rearview mirror is fitted, the bearing sections interacting with each other in some regions, to be precise only in the region of in each case 6 oblique surfaces, in a form-fitting manner. As a result, a statically satisfactory, defined connection of the mirror foot to the inner reinforcement of the door is obtained.

In accordance with an added feature of the invention, the lower end region of the inner supporting part of the mirror foot is connected to an upper, approximately horizontally oriented subregion of the inner frame part, the upper, approximately horizontally oriented subregion extends in a longitudinal direction of the vehicle.

In accordance with an additional feature of the invention, the bearing sections on the inner reinforcement of the front door are provided on the upper, approximately horizontally oriented subregion of the inner frame part, as seen in a transverse direction of the vehicle, on a side which faces the outer panel.

In accordance with a further feature of the invention, the inner reinforcement has a central throughhole formed therein for receiving the fastening screw; and the bearing sections on the inner reinforcement include three protruding surface regions disposed in a star-shaped manner with respect to the central throughhole for the fastening screw, and recessed surface regions disposed lying in between the protruding surface regions. Each of the protruding surface regions has oblique surfaces connected to adjacent ones of the recessed surface regions.

In accordance with a further feature of the invention, the bearing sections of the mirror foot are provided on the lower end region of the inner supporting part. The mirror foot has in the lower end region an approximately hollow-cylindrical basic body with an end side, and the bearing sections on the mirror foot are provided on an outer side of the end side of the approximately hollow-cylindrical basic body.

In accordance with a further added feature of the invention, the mirror foot has a centrally threaded holder. The bearing sections on the mirror foot are formed by three protruding surface regions disposed in an approximately star-shaped manner with respect to the central internally threaded holder and are in the shape of a segment of a circle, and three recessed surface regions which lie in between the protruding surface regions, each of the protruding surface regions which are in the shape of the segment of the circle have oblique surfaces connected to adjacent ones of the recessed surface regions.

In accordance with another added feature of the invention, when the exterior rearview mirror is fitted, the mirror foot and the inner reinforcement of the front door bear directly against each other only in one of a full region and in subregions by six of the oblique surfaces.

Other features which are considered as characteristic for the invention are set forth in the appended claims.

Although the invention is illustrated and described herein as embodied in an exterior rearview mirror for vehicles, in particular passenger vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
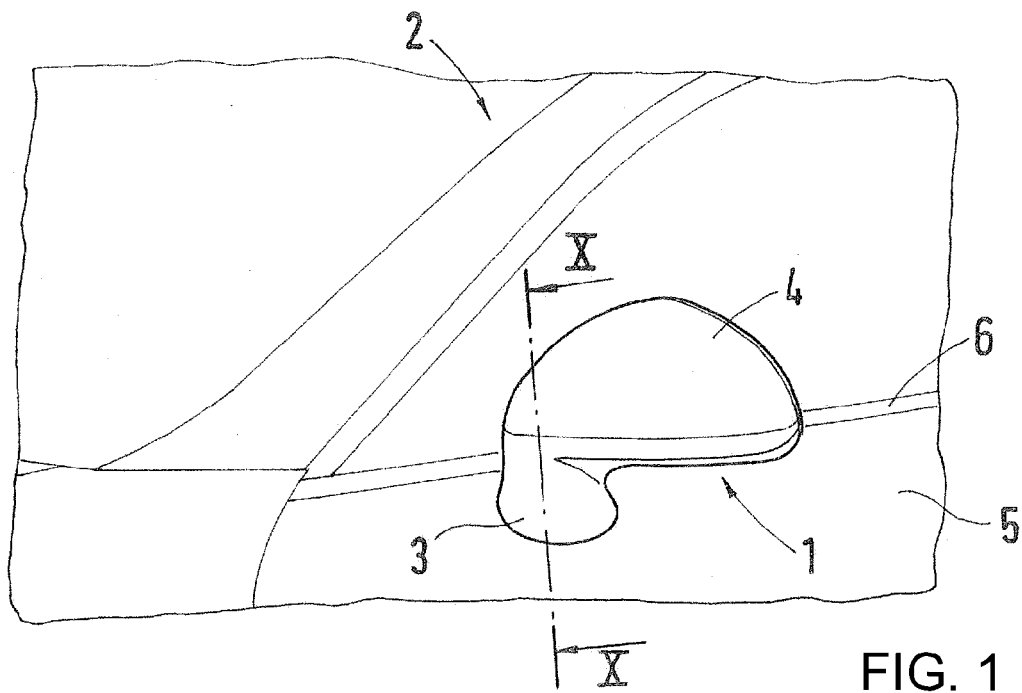
FIG. 1 is a diagrammatic, oblique, perspective view of a subregion of a passenger vehicle with an exterior rearview mirror according to the invention.
Figure 2:
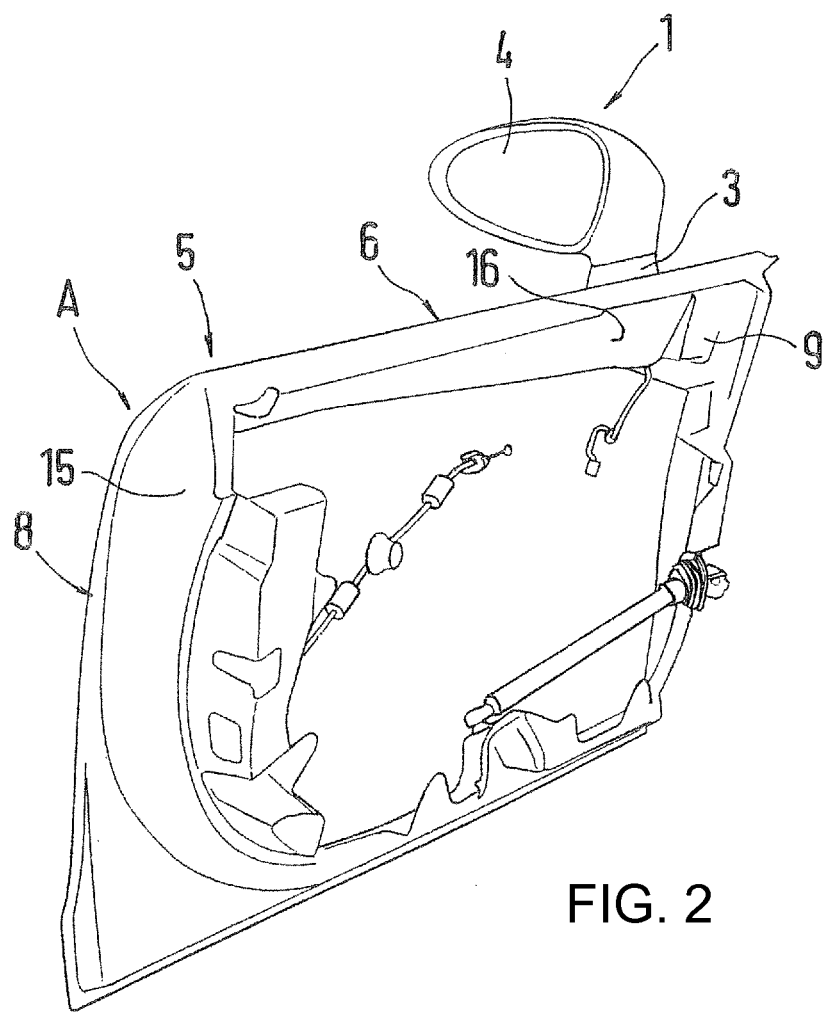
FIG. 2 is a diagrammatic, perspective view of an inside of an outer module of a motor vehicle door with the exterior rearview mirror fastened thereto.
Figure 10:
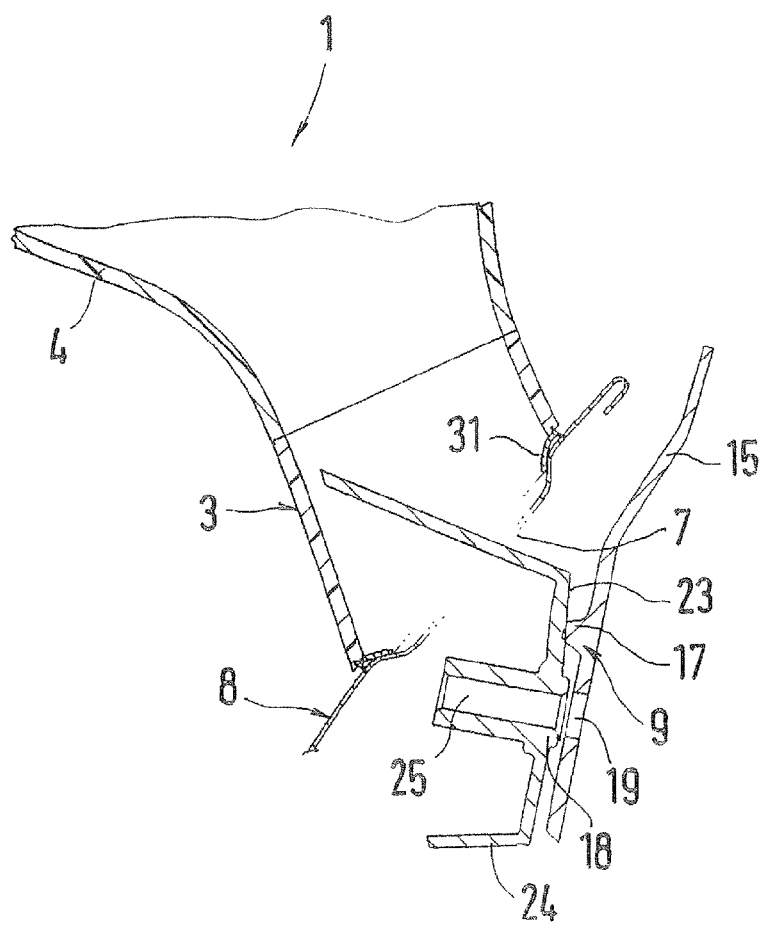
FIG. 10 is a diagrammatic, sectional view of the exterior rearview mirror taken along the line X-X shown in FIG. 1.

Referring now to the figures of the drawing in detail and first, particularly, to FIG. 1 thereof, there is shown an exterior rearview mirror 1 for vehicles, in particular passenger vehicles 2, that is composed of a mirror foot 3 and a mirror head 4 and is fastened to a front, lateral door 5 below a vehicle belt line 6. In the fastening region of the exterior rearview mirror 1, the door contains an outer panel 8 which is provided with an opening 7, and an inner reinforcement 9 (see FIGS. 2 and 10).

Figure 3:
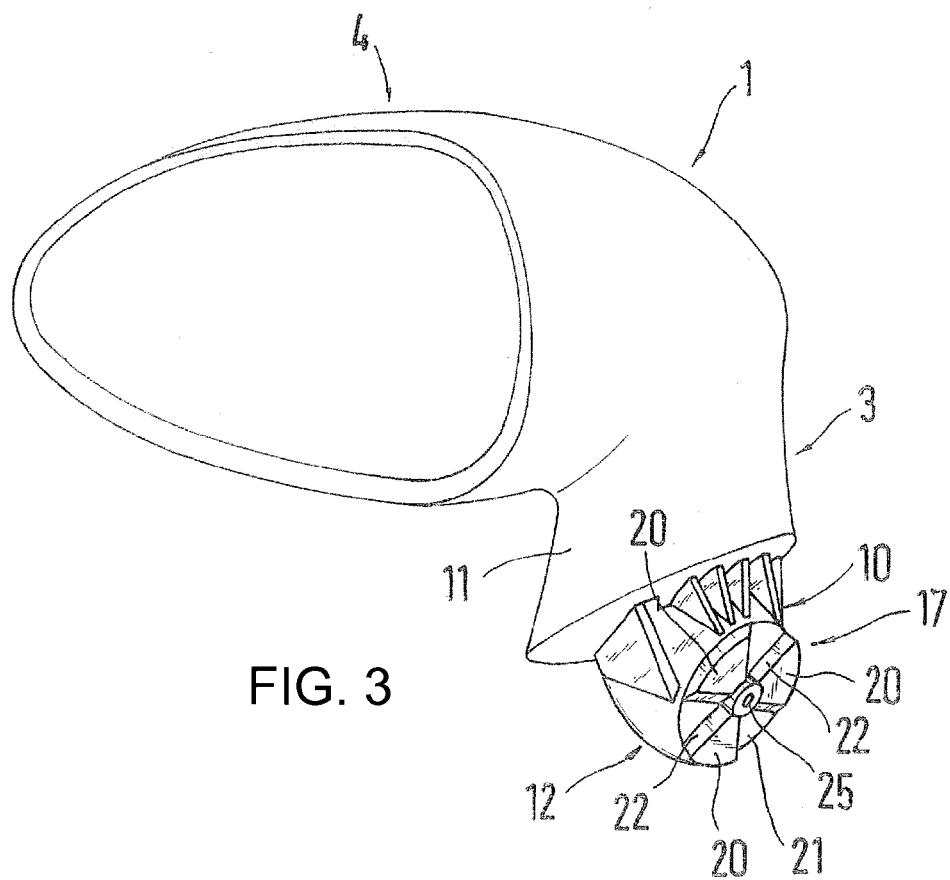
FIG. 3 is a diagrammatic, rear perspective view of the exterior rearview mirror which contains a mirror foot with an inner supporting part.

In the exemplary embodiment, the mirror foot 3 contains an inner supporting part 10 and an outer mirror foot cover 11 (see FIG. 3). The inner supporting part 10 is preferably formed by a diecast part made from a light metal alloy, whereas the outer mirror foot cover 11 is formed by a single-part or multi-part plastic part.

Figure 4:
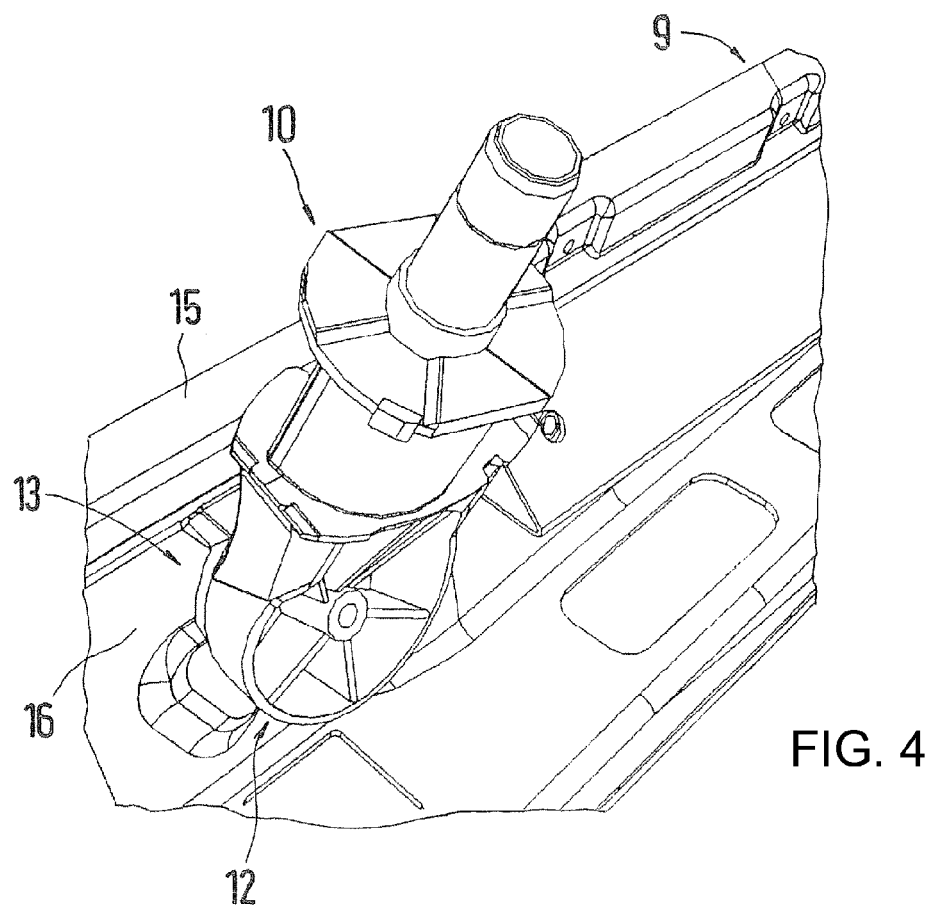
FIG. 4 is a diagrammatic, perspective view of an inside of a connection of the mirror foot to the motor vehicle door.
Figure 9:
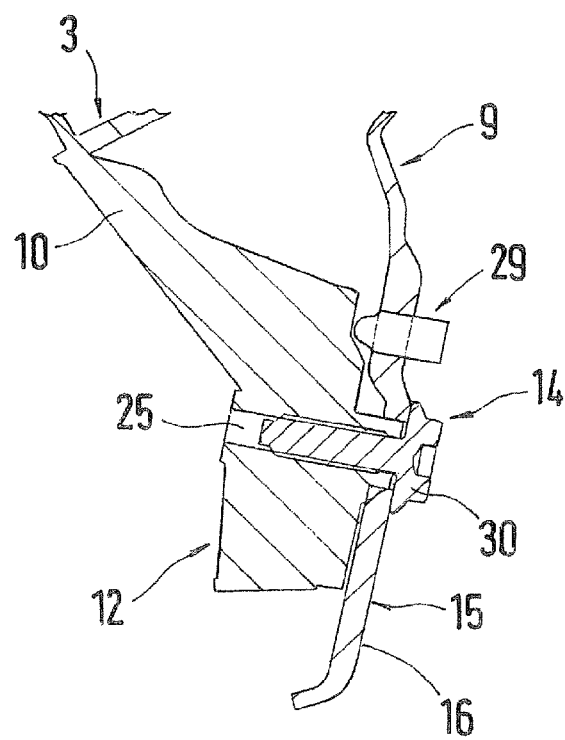
FIG. 9 is a diagrammatic, sectional view of the self-centering mounting taken along the line IX-IX shown in FIG. 7.

According to the invention, a lower end region 12 of the inner supporting part 10 of the mirror foot 3 is guided through the opening 7 in the outer panel 8 and is connected within the door 5 directly to an inner reinforcement 9 of the door 5 via a self-centering mounting 13 and a central fastening screw 14 (see FIGS. 4 and 9). In the exemplary embodiment, the inner reinforcement 9 is formed by a preferably encircling, inner frame part 15 which is produced from a light metal alloy (e.g. aluminum or magnesium alloy) by diecasting. However, the inner reinforcement 9 could also be formed by assembled extruded profile parts which together form an encircling frame part 15.

Figure 5:
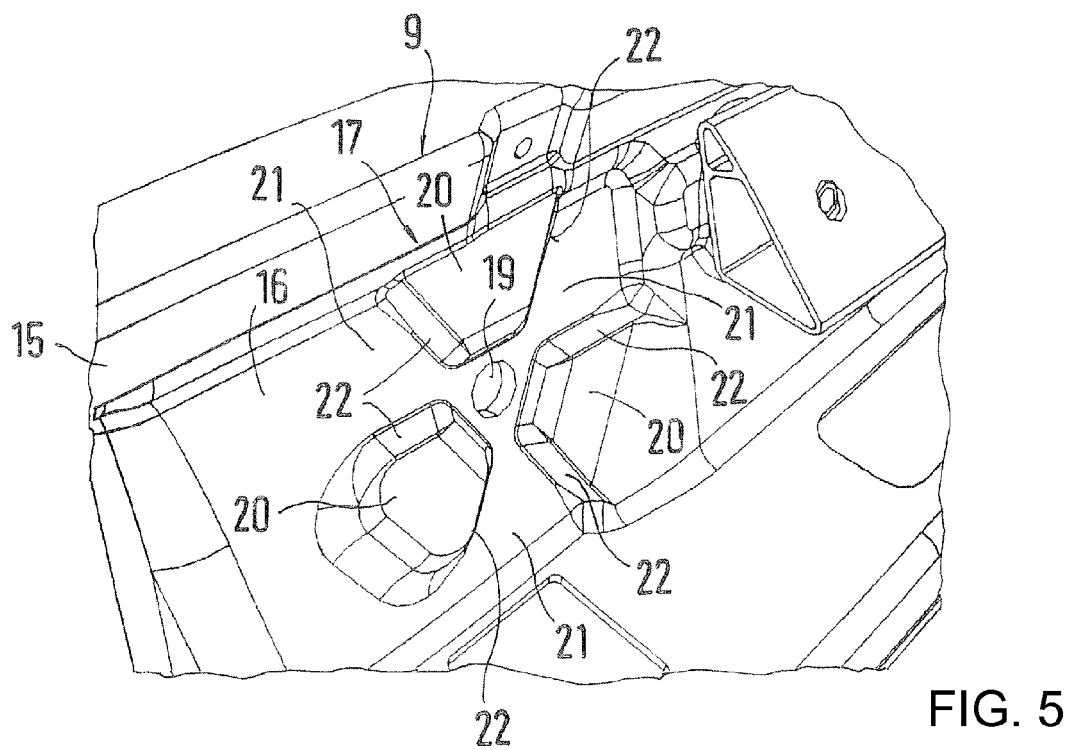
FIG. 5 is a diagrammatic, perspective view of an inside of an outer module of the motor vehicle door.

The encircling, inner frame part 15 and the outer panel 8 which is manufactured from aluminum or steel sheet form a premanufactured outer module A of the door 5, on which the exterior rearview mirror 1 is fitted. The lower edge region 12 of the supporting part 10 of the mirror foot 3 is connected to an upper, approximately horizontally oriented subregion 16 of the inner frame part 15, which subregion extends in the longitudinal direction of the vehicle (see FIG. 5).

The self-centering mounting 13 between the supporting part 10 of the mirror foot 3 and the inner reinforcement 9 of the door 5 is configured as a 6-point mounting, as a result of which a statically unambiguously defined, low-vibration and rigid connection of the exterior rearview mirror 1 to the door 5 is obtained.

In order to form the 6-point mounting, respective integrally formed bearing sections 17, 18 are provided on the inner frame part 15 of the door 5 and on the lower end region 12 of the supporting part 10 and, when the exterior rearview mirror 1 is fitted, interact with each other in some regions in a form-fitting manner. The bearing sections 17 of the inner reinforcement 9 of the door 5 are provided on the upper, approximately horizontally oriented subregion 16 of the inner frame part 15, to be precise on the side which faces the outer panel 8 (see FIG. 5). The subregion 16 of the frame part 5 is provided with three protruding surface regions 20 which are arranged in an approximately star-shaped manner with respect to a central throughhole 19 for the fastening screw 14, and three recessed surface regions 21 which are arranged lying in between, with each protruding surface region 20 being connected via oblique surfaces 22 to adjacent recessed surface regions 21.

Figure 6:
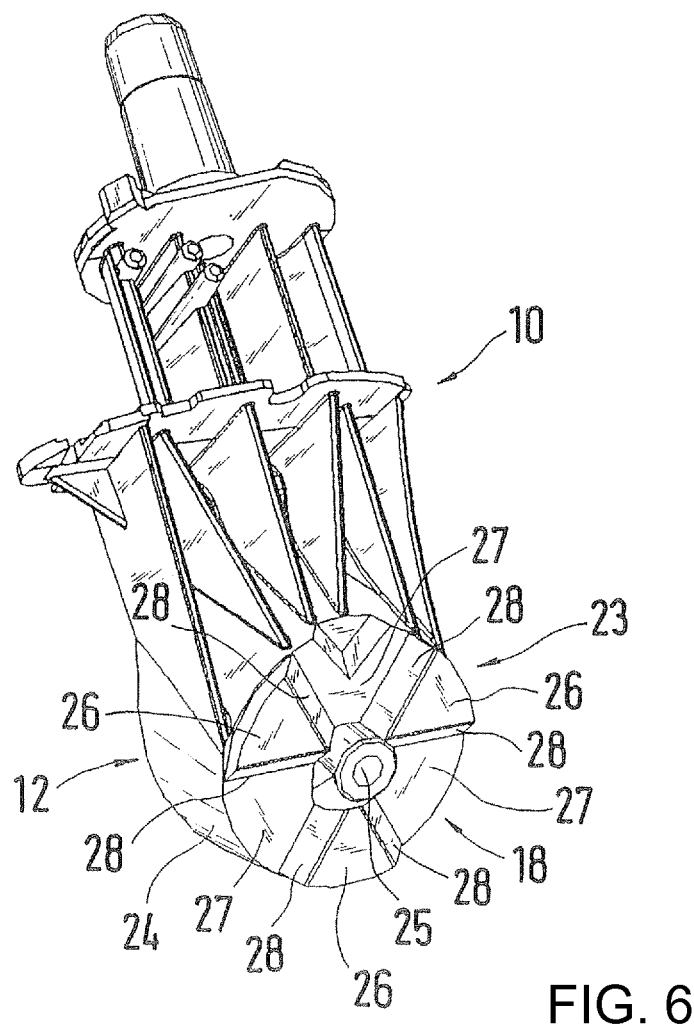
FIG. 6 is a diagrammatic, perspective view of an inner supporting part of the mirror foot.

The bearing sections 18 of the mirror foot 3 are provided on the lower end region 12 of the inner supporting part 10, to be precise on the outer side of a closed end side 23 of an approximately horizontally arranged, hollow-cylindrical basic body 24 (see FIG. 6). The bearing sections 18 of the mirror foot 3 are formed by three protruding surface regions 26 which are arranged in an approximately star-shaped manner with respect to a central internally threaded holder 25 and are in the shape of a segment of a circle, and three recessed surface regions 27 which lie in between. Each protruding surface region 26 which is in the shape of a segment of a circle is connected via oblique surfaces 28 to the two adjacently arranged, recessed surface regions 27.

Figure 7:
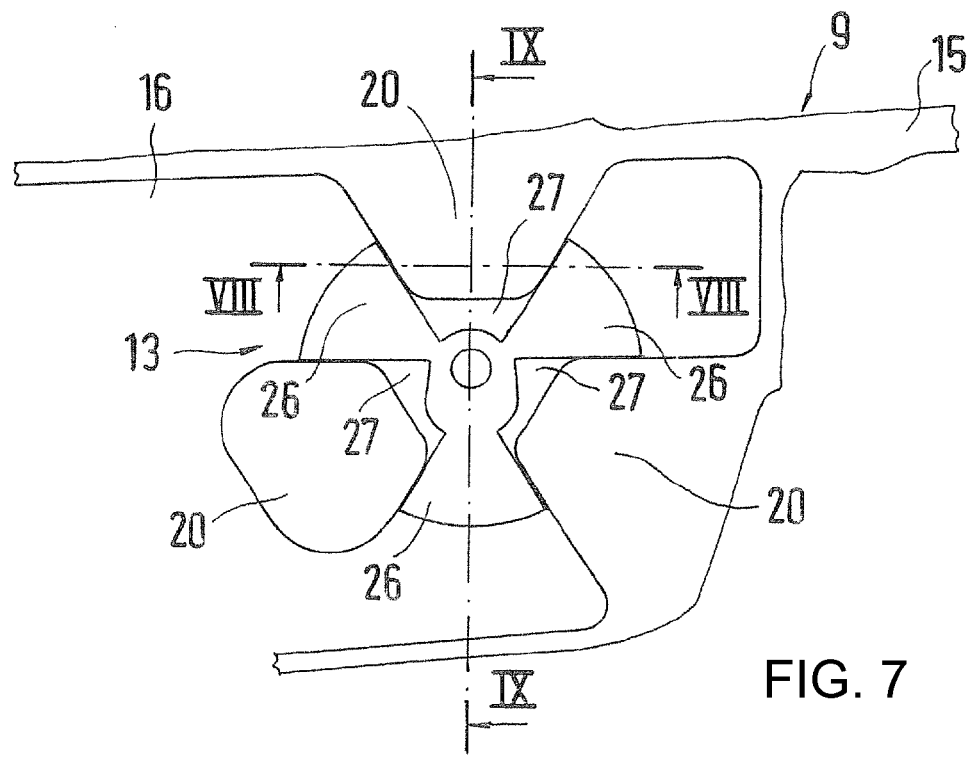
FIG. 7 is an illustration of an inside of a self-centering mounting of the mirror foot.
Figure 8:
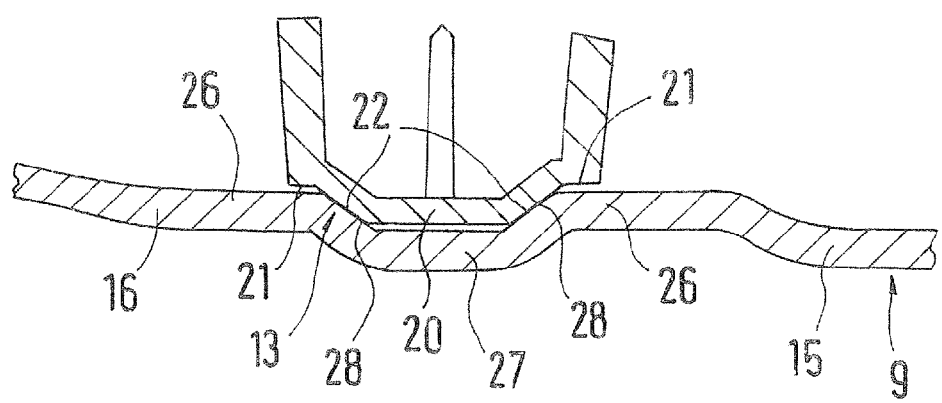
FIG. 8 is a diagrammatic, sectional view of the self-centering mounting taken along the line VIII-VIII shown in FIG. 7.

When the exterior rearview mirror 1 is fitted, the mirror foot 3 and the inner reinforcement 9 of the door 5 bear directly against each other only in the full region or in subregions of the longitudinal extent of the in each case six oblique surfaces 22, 28 (see FIGS. 7-8).

If support is provided only in subregions of the longitudinal extent of the in each case six oblique surfaces 22, 28, then the subregions are disposed relatively far away from the center of the central fastening screw 14 so as to obtain a stable base.

On the 6-point mounting, at least one of the protruding surface regions 20 of the inner reinforcement 9 could be replaced by an adjustment element 29 which extends in the transverse direction of the vehicle, thus providing a possibility of adjustment in the transverse direction of the vehicle (see FIG. 9).

The fastening screw is screwed through the throughhole 19 in the inner reinforcement 9 into the internally threaded holder 25 of the supporting part 10 from that side of the inner reinforcement 9 which faces the passenger compartment, and is supported on the inner reinforcement 9 by a widened head section 30. A small gap runs in each case, seen in the transverse direction of the vehicle, between corresponding surface sections of the inner reinforcement 9 and of the mirror foot 3.

The mirror foot 3 is not supported directly on the outer side of the outer panel 8 either by the supporting part 10 or by the mirror foot cover 11. According to FIG. 10, the end side of the mirror foot cover 11 has a lip-shaped sealing frame 31 which rests on the outer side of the outer panel 8 adjacent to the opening 7.

The invention claimed is:

1. An exterior rearview mirror for a vehicle having a front door, the front door having an outer panel with an opening formed therein and an inner reinforcement, the inner reinforcement having a through hole and an alternating array of protruding and recessed surface regions defining segments of a circle substantially concentric with the through hole, alignment surfaces extending obliquely between each of the protruding surface regions and the recessed surface regions adjacent thereto, said mirror having an inner supporting part with an end region configured to be guided through the opening in the outer panel, the end region having an internally threaded holder and an alternating array of protruding and recessed surface regions defining segments of a circle substantially concentric with the internally threaded holder, alignment surfaces extending obliquely between each of the protruding surface regions of the end region and the recessed surface regions adjacent thereto so that the protruding and recessed surface regions of the end region nest with the recessed and protruding surface regions of the inner reinforcement so that the through hole aligns with the internally threaded holder, and a central fastening screw passing through the through hole in the inner reinforcement and being threadedly engaged in the internally threaded holder for holding the mirror on the door.

2. The exterior rearview mirror according to claim 1, wherein the inner reinforcement is formed by an encircling, inner frame part being produced from a light metal alloy by die-casting.

3. The exterior rearview mirror according to claim 2, wherein said end region of said inner supporting part of said mirror is connected to an upper, approximately horizontally oriented subregion of the inner frame part, the upper, approximately horizontally oriented subregion extending in a longitudinal direction of the vehicle.

4. The exterior rearview mirror according to claim 3, wherein the inner reinforcement and the end region of the mirror each have three protruding surface regions and six alignment surfaces to define a 6-point mounting.

5. The exterior rearview mirror according to claim 4, wherein said 6-point mounting has respective integrally formed bearing sections provided on said inner frame part of the front door and at said end region of said inner supporting part and, when the exterior rearview mirror is fitted, said bearing sections interact with each other in some regions in a form-fitting manner.

6. The exterior rearview mirror according to claim 5, wherein said bearing sections on the inner reinforcement of the front door are provided on the upper, approximately horizontally oriented subregion of the inner frame part, as seen in a transverse direction of the vehicle, on a side which faces the outer panel.

7. The exterior rearview mirror according to claim 6, wherein said end region has an approximately hollow-cylindrical body with an end, said bearing sections being provided on an outer side of said end of said approximately hollow-cylindrical body.

8. The exterior rearview mirror according to claim 1, wherein the exterior rearview mirror is for use in a passenger vehicle.

9. A front door for a vehicle, the front door comprising:
an outer door panel having an opening formed therein;
an inner door reinforcement formed with a through hole and an alternating array of protruding and recessed surface regions defining segments of a circle substantially concentric with the through hole, alignment surfaces extending obliquely between each of the protruding surface regions and the recessed surface regions adjacent thereto;
an exterior rearview mirror
fixed on said outer door panel, said mirror having an inner supporting part between the outer door panel and the inner door reinforcement, the inner supporting part having an end region with an internally threaded holder and an alternating array of protruding and recessed surface regions defining segments of a circle substantially concentric with the internally threaded holder, alignment surfaces extending obliquely between each of the protruding surface regions of the end region and the recessed surface regions adjacent thereto so that the protruding and recessed surface regions of the mirror nest with the recessed and protruding surface regions of said inner door reinforcement with the alignment surfaces self centering the mirror relative to the inner door reinforcement; and
a central fastening screw passing through the through hole in the inner reinforcement and being threadedly engaged in the internal a threaded holder for holding the mirror with respect to the outer panel and the inner door reinforcement.

10. A mirror mounting assembly for a vehicle door, comprising:
a door having an outer panel with an opening and an inner reinforcement with a through hole, the inner reinforcement having an alternating array of protruding and recessed surface regions defining segments of a circle substantially concentric with the through hole, alignment surfaces extending obliquely between each of the protruding surface regions and the recessed surface regions adjacent thereto;
a mirror having an inner supporting part with an end region configured to be guided through the opening in the outer panel, the end region having an internally threaded holder and an alternating array of protruding and recessed surface regions defining segments of a circle substantially concentric with the internally threaded holder, alignment surfaces extending obliquely between each of the protruding surface regions and the recessed surface regions adjacent thereto, the protruding and recessed surface regions of the end region being configured to mate with the recessed and protruding surface regions of the inner reinforcement so that the through hole aligns with the internally threaded holder; and
a central fastening screw passing through the through hole in the inner reinforcement and being threadedly engaged in the internally threaded holder for holding the mirror on the door.

* * * * *